United States Patent Office 3,390,534
Patented July 2, 1968

3,390,534
METHOD FOR SEPARATION OF MULTI-COMPONENT MIXTURES
Boris Georgievich Bergo, Nina Ivanovna Zelentsova, and Kira Petrovna Berezhnaja, Moscow, and Anatoly Grigorjevich Cheglikov and Alexandr Ivanovich Pjatnichko, Kiev, U.S.S.R., assignors to Nauchno-Issledovatelsky Institute Sinteticheskikh Spiritov i Organicheskikh Produktov, Moscow, U.S.S.R.
Filed Oct. 29, 1964, Ser. No. 407,370
3 Claims. (Cl. 62—28)

The present invention relates to a method for the separation of multicomponent mixtures.

A method is widely known for the saparation of gas mixtures by distillation. This method is characterized by high power consumption and complicated technology.

A method is known for the separation of gas mixtures using processes of counterflow condensation and counterflow evaporation carried out under conditions of thermal interaction of said mixtures. The method has been developed for the separation of binary mixtures such as ethane-ethylene, propane-propylene (inventor's certificate No. 117,913, 1957).

An object of the present invention is to provide a method for the separation of multicomponent mixtures which would ensure the most efficient utilization of temperature drops, and an economic method for supplying cold in a fractionating system.

Another object of the invention is to reduce power consumption and to improve the conditions for the desiccation of the initial mixture and the removal of undesirable impurities therefrom.

In accordance with the above, concept of the invention consists in that a gaseous mixture obtained by intermixing an initial multicomponent mixture and a stream circulating in the system, is condensed under a relatively high pressure, the condensate and said gaseous mixture flowing opposite to each other so as to yield a high-volatility fraction and a condensate enriched with low-volatility fractions. The condensate thus obtained is throttled to a low pressure and then evaporated at this low pressure at the expense of the heat generator during the condensation of said gaseous mixture with the distillation vapor and the condensate flowing in opposite directions, yielding the required low-volatility fraction and distillation vapor enriched with high-volatility components. The distillation vapor is compressed in a compressor to a relatively high pressure, then cooled and the stream circulating in the system is mixed with fresh initial multicomponent mixture.

The invention also ensures partial liquefaction of the high-volatility fraction during its further separation and the extraction of a certain amount of heat from the system to make this separation possible. The partial liquefaction of the high-volatility fraction is achieved by utilizing the cold of evaporation of the condensate obtained from the initial mixture, and that of the distillation vapor.

The other objects of the invention as well as its advantages and specific features will become more apparent by referring to the description of the invention and the accompanying drawings, in which.

Figure 1:
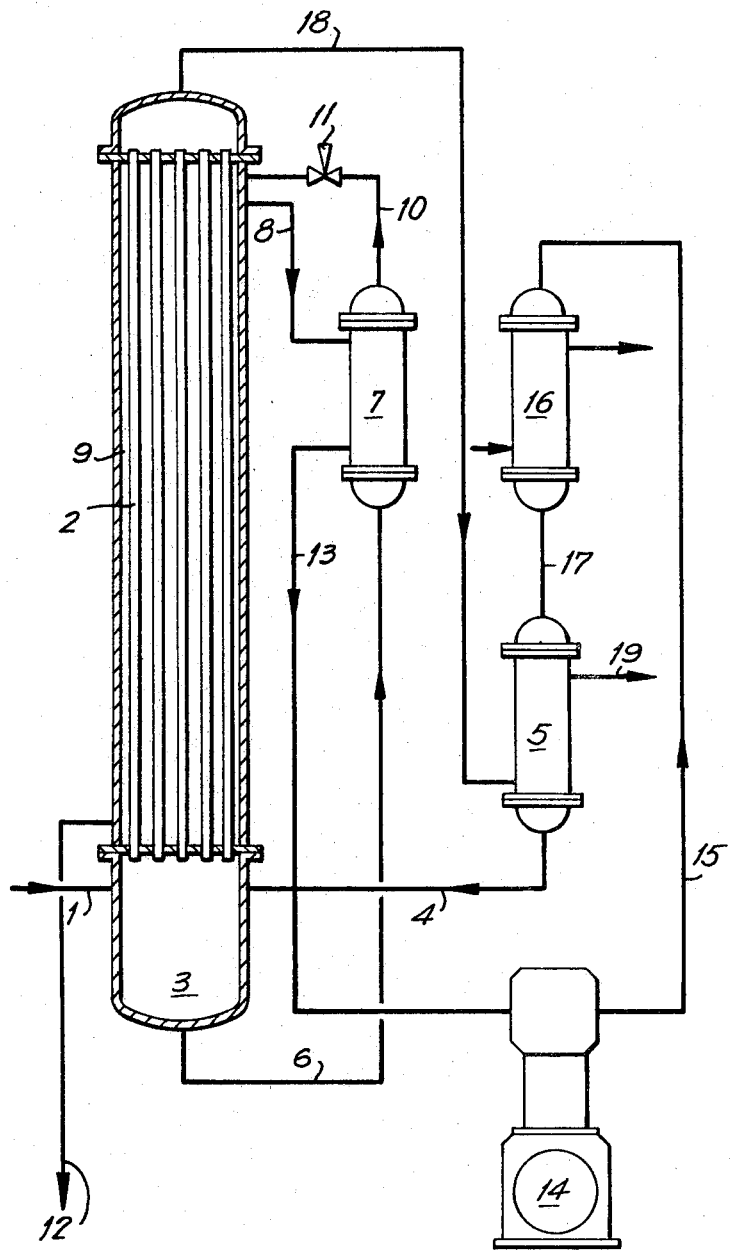
FIG. 1 is a diagram of the separation of a multicomponent mixture when the high-volatility fraction of the pyroylsis gas is not subjected to further fractionation.

Referring to FIG. 1 of the present application, the initial multicomponent mixture which has been desiccated and free from impurities is fed through conduit 1 to the bottom of tubular space 2 of column 3. Simultaneously, vapor-liquid stream in the form of compressed and cooled distillation vapor is supplied from heat exchanger 5 via conduit 4 to the bottom of tubular space 2 of column 3. The gaseous mixture obtained by intermixing of the multicomponent initial mixture and the circulating stream of distillation vapor, rises along tubes in space 2 of column 3, being condensed in part and enriched with low-volatility components. The condensate collects at the bottom of column 3 and together with the liquid fraction of the distillation vapor is directed by conduit 6 to heat exchanger 7, where it is cooled by the distillation vapor removed by conduit 8 from the top of intertubular space 9 of column 3 and is directed along conduit 10 through throttle valve 11 to intertubular space 9 of column 3.

The throttled condensate partly evaporates in intertubular space 9 of column 3 at the expense of the heat yielded by the condensed vapors in tubular space 2 of column 3 and is enriched by high-volatility components. The desired low-volatility fraction is withdrawn in liquid state through conduit 12. The distillation vapor from heat exchanger 7 is directed through conduit 13 to compressor 14, where it is compressed and flows along conduit 15 to cooler 16, which is cooled by water or any other suitable coolant. The vapor is condensed in cooler 16 and is directed along conduit 17 to heat exchanger 5, in which the high-volatility fraction from the top of tubular space 2 of column 3 is transferred into heat exchanger 5 via conduit 18 and extracts heat from the distillation vapor. In cooler 16 and heat exchanger 15 the distillation vapor is condensed until, under heat balance conditions, the low-volatility fraction is withdrawn in liquid state from column 3 via conduit 12. The cooled vapor-liquid stream from heat exchanger 5 flows via tube 4 to the bottom of column 3. From heat exchanger 5 the high-volatility fraction is withdrawn in heated state via conduit 19 for use.

Figure 2:
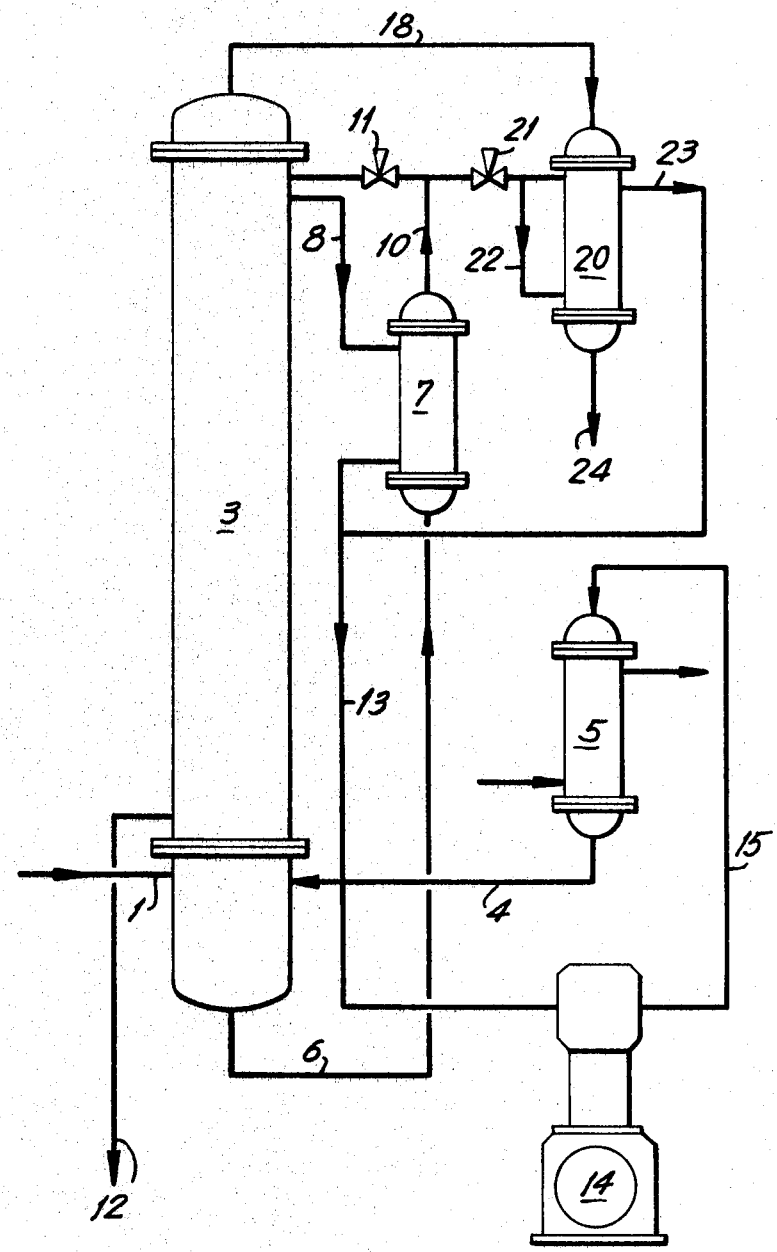
FIG. 2 is a diagram of the separation of multicomponent mixtures when the high-volatility fraction is sent for further fractionation.

If it is desired to further split the high-volatility fraction, it should leave the system liquefied in part. For this purpose, as shown in FIG. 2, the high-volatility fraction removed from tubular space 2 of column 3 via conduit 18 passes through heat exchanger 20, in which coolant is provided by part of the condensate removed from the bottom of column 3. This condensate is removed from column 3 through conduit 6 and passes through cooler 7, then it is directed along conduit 10 to throttle valve 21 and arrives via conduit 22 to heat exchanger 20. In heat exchanger 20 the throttled condensate is evaporated and the resultant vapor is withdrawn through conduit 23, then compressed and returned to tubular space 2 of column 3. From heat exchanger 20 the high-volatility fraction is delivered via conduit 24 to the consumers.

The advantage of this method is that the condensation of the distillation vapor is carried out at a higher temperature as compared with the compression and condensation of the initial mixture or with the condensation of the high-volatility fraction, since the distillation vapor always contains considerably fewer incondensible light components than said fractions.

Another advantage of the present invention is that the distillation vapor is compressed separately from the initial mixture, and, therefore, the equipment for desiccation and purification is not overburdened with a ballast flow.

In implementing this invention, it is preferable that the temperature of the initial mixture should be as high as possible so as to reduce the pressure drop in the compressor for the distillation vapor.

The following examples will held those skilled in the art to better understand the present invention.

Example 1

Initial mixture-byproduct petroleum gas (in vol. percent):

| | |
|---|---|
| $N_2$ | 9.5 |
| $CH_4$ | 43.4 |
| $C_2H_6$ | 21.6 |
| $C_3H_6$ | 16.8 |
| $C_4$ | 5.9 |
| $C_5, C_6, C_7$ | 2.8 |

This example refers to the extraction, from byproduct petroleum gas, of hydrocarbons $C_3$ and heavier ones, and their steam-refining from hydrocarbons $C_2$ carried out in accordance with the diagram of FIG. 1.

The intial mixture enters column 1 at 330° C. and 40 atms. A high-volatility fraction of the following composition is skimmed from the top of the column at 248° K. in the amount of 76.9 moles per 100 moles of the initial mixture (in vol. percent):

| | |
|---|---|
| $N_2$ | 12.5 |
| $CH_4$ | 56.5 |
| $C_2H_6$ | 27.9 |
| $C_3H_6$ | 3.1 |
| Total | 100.0 |

A fraction of hydrocarbons $C_3$, $C_4$, $C_5$ and heavier ones are removed from the bottom of the column at 10 atms. The amount of distillation vapor is 25 moles per 100 moles of the initial mixture. When cooled with water at a temperature of 283° K. and with the cold high-volatility, fraction this vapor condenses almost completely.

Example 2

This example refers to the separation of pyrolysis gases and light hydrocarbons according to components $C_2$–$C_3$ carried out in accordance with the above diagram of FIG. 2.

Iinitial mixture-gasoline pyrolysis gas (in vol. percent):

| | |
|---|---|
| $H_2$ | 18.0 |
| $CH_4$ | 30.0 |
| $C_2H_4$ | 32.0 |
| $C_2H_6$ | 10.0 |
| $C_3$ | 8.0 |
| $C_4$ | 2.0 |

The pyrolysis gas enters column 1 at 290° K. and 40 atms. A fraction consisting of $H_2$, $CH_4$ and $C_2$ in the amount of 90.32 moles per 100 moles of the initial mixture is skimmed from the top of the column at 240° K. The concentration of hydrocarbons $C_3$ in the high-volatility fraction is 0.3 vol. percent. A fraction consisting of $C_3$ and $C_4$ is removed from the bottom of the column in a liquid state. The pressure in the intertubular space of the column is 8 atms. To ensure the necessary reflux in the column, the amount of the distillation vapor is maintained at about 30 moles per 100 moles of the initial mixture. The cooling of the compressed distillation vapor to 290° K. results in the condensation of 70% of the fraction.

This degree of condensation is sufficient for the fraction $C_3$ and $C_4$ to be removed in a liquid state without disturbing the heat balance of the column.

The present invention is applied in separating pyrolysis and petroleum refining gases at plants for topping natural and byproduct gases.

It should be noted that the present invention ensures a higher temperature of condensation of the distillation vapor as compared with other possible methods, and enables power consumption in the cooling cycle to be reduced.

Although the present invention has been described with reference to the preferred embodiment, it is understood that there be changes and modifications without departing from the spirit and scope of the invention, which will be readily understood by those skilled in the art.

These changes and modifications are considered to be within the substance and scope of the invention and the accompanying claims.

What we claim is:

1. A method of separating multicomponent mixtures under two pressure levels for obtaining a high-volatility fraction and a low-volatility fraction in a liquid state, said method comprising: (a) condensing a gaseous mixture obtained by intermixing of an initial multicomponent mixture and a liquid stream in the system at a relatively high pressure, the resultant condensate and gaseous mixture flowing in opposite directions to yield the desired high-volatility fraction and a condensate enriched with low-volatility components; (b) expanding said condensate to a low pressure level; (c) partially evaporating the condensate under a relatively low pressure by exchange of heat with the gaseous mixture being condensed to produce a resultant distillation vapor and a resultant condensate which flow in opposite directions and wherein said resultant condensate yields the desired liquid low-volatility fraction and said distillation vapor is enriched with high-volatility components; (d) compressing said resultant distillation vapor to a relatively high pressure level, cooling the latter to produce a liquid, said cooling including the step of passing said high-volatility fraction in heat exchange relation with the compressed distillation vapor, and supplying the latter liquid as said liquid stream for mixing with a fresh initial multicomponent mixture.

2. A method as claimed in claim 1 comprising cooling and partially condensing said high-volatility fraction by evaporating a portion of the condensate resulting from the condensing of said gaseous mixture, and passing the latter portion into heat exchange relationship with said high-volatility fraction.

3. A method as claimed in claim 1 comprising cooling the condensate resulting from the condensing of said gaseous mixture by passing the same into heat exchange relation with said resultant distillation vapor, said condensate being cooled prior to the expansion thereof.

References Cited

UNITED STATES PATENTS

| | | | |
|---|---|---|---|
| 2,600,110 | 6/1952 | Hachmuth | 62—23 |
| 2,619,814 | 12/1952 | Kniel | 62—28 |
| 2,940,271 | 6/1960 | Jackson | 62—31 |
| 3,123,457 | 3/1964 | Smith | 62—30 |
| 2,692,484 | 10/1954 | Etienne | 62—31 |
| 2,765,637 | 10/1956 | Etienne | 62—31 |
| 3,056,268 | 10/1962 | Grenier | 62—31 |
| 3,197,970 | 8/1965 | Nelson et al. | 62—31 |

FOREIGN PATENTS

| | | | |
|---|---|---|---|
| 3,217,502 | 11/1965 | Keith | 62—31 |
| 69,438 | 6/1949 | Denmark. | |

NORMAN YUDKOFF, *Primary Examiner.*

WILBUR L. BASCOMB, JR., *Examiner.*

V. W. PRETKA, *Assistant Examiner.*